(12) United States Patent
Sorkin

(10) Patent No.: US 11,208,808 B2
(45) Date of Patent: Dec. 28, 2021

(54) BARRIER CABLE COUPLER

(71) Applicant: Felix Sorkin, Stafford, TX (US)

(72) Inventor: Felix Sorkin, Stafford, TX (US)

(*) Notice: Subject to any disclaimer, the term of this patent is extended or adjusted under 35 U.S.C. 154(b) by 45 days.

(21) Appl. No.: 16/834,796

(22) Filed: Mar. 30, 2020

(65) Prior Publication Data

US 2020/0224416 A1 Jul. 16, 2020

Related U.S. Application Data

(63) Continuation of application No. 15/724,381, filed on Oct. 4, 2017, now Pat. No. 10,640,978.

(60) Provisional application No. 62/404,134, filed on Oct. 4, 2016.

(51) Int. Cl.
| | |
|---|---|
| *E04C 5/12* | (2006.01) |
| *F16G 11/04* | (2006.01) |
| *E01F 15/06* | (2006.01) |
| *F16G 11/12* | (2006.01) |
| *E04B 1/41* | (2006.01) |
| *E01F 13/02* | (2006.01) |
| *E04H 17/08* | (2006.01) |
| *E04H 17/24* | (2006.01) |

(52) U.S. Cl.
CPC ............... *E04C 5/125* (2013.01); *E01F 15/06* (2013.01); *E04B 1/4114* (2013.01); *F16G 11/048* (2013.01); *F16G 11/12* (2013.01); *E01F 13/022* (2013.01); *E04H 17/08* (2013.01); *E04H 17/24* (2013.01)

(58) Field of Classification Search
CPC .......... E04C 5/125; E04C 5/122; E04C 5/165; F16G 11/048; F16G 11/12; F16G 11/08; E01F 15/06; E01F 13/022; E04B 1/4114; E04H 17/08; E04H 17/24; F16B 7/06; H01R 13/585
See application file for complete search history.

(56) References Cited

U.S. PATENT DOCUMENTS

| | | | |
|---|---|---|---|
| 1,879,636 | A | 9/1932 | Cole |
| 2,369,413 | A | 2/1945 | Rusz |
| 4,081,219 | A | 3/1978 | Dykmans |

OTHER PUBLICATIONS

European Office Action issued in EP application No. 20197475.5 dated Mar. 12, 2021 (5 pages).

*Primary Examiner* — Basil S Katcheves
*Assistant Examiner* — Omar F Hijaz
(74) *Attorney, Agent, or Firm* — Locklar PLLC

(57) ABSTRACT

A barrier cable coupler for coupling two lengths of barrier cable comprises a coupler body including a threaded inner surface, a first end, and a second end; a fixed retaining collar having an outer surface and being retained to the first end of the coupler body, the fixed retaining collar including a tapered inner surface; one or more fixed end wedges positioned within the tapered inner surface of the fixed retaining collar; a tensioning retaining collar having an outer surface, the tensioning retaining collar positioned at least partially within the second end of the coupler body and including a tapered inner surface; one or more tensioning end wedges positioned within the tapered inner surface of the tensioning retaining collar; and a tensioning nut including a threaded outer surface engaging the threaded inner surface of the second end of the coupler body and retaining the tensioning retaining collar therein.

14 Claims, 11 Drawing Sheets

BARRIER CABLE COUPLER

CROSS-REFERENCE TO RELATED APPLICATIONS

This application is a continuation application that claims priority to U.S. application Ser. No. 15/724,381, filed Oct. 4, 2017, which is a non-provisional application which claims priority from U.S. provisional application No. 62/404,134, filed Oct. 4, 2016, which is incorporated by reference herein in its entirety.

TECHNICAL FIELD/FIELD OF THE DISCLOSURE

The present disclosure relates generally to mechanical couplers, and specifically to mechanical couplers for cables.

BACKGROUND OF THE DISCLOSURE

Barrier cable installations are restraint systems used in parking garages, along highways, and in other structures. Barrier cable installations typically include one or more barrier cables placed under tension to restrain movement of vehicles and pedestrians. The barrier cables are typically extended between structures such as columns or walls and are anchored thereto.

SUMMARY

The disclosure provides for a barrier cable coupler for coupling two lengths of barrier cable. The barrier cable coupler includes a coupler body, the coupler body including an inner surface and the coupler body having a first end and a second end. The barrier cable coupler further includes a fixed retaining collar, the fixed retaining collar having an outer surface. The outer surface of the fixed retaining collar is retained to the threaded inner surface of the coupler body at the first end. The fixed retaining collar includes a tapered inner surface. The barrier cable coupler also includes one or more fixed end wedges positioned within the tapered inner surface of the fixed retaining collar and a tensioning retaining collar. The tensioning retaining collar has an outer surface. The tensioning retaining collar is positioned within the coupler body at the second end of the coupler body, and the tensioning retaining collar includes a tapered inner surface. The barrier cable coupler also includes one or more tensioning end wedges positioned within the tapered inner surface of the tensioning retaining collar and a tensioning nut. The tensioning nut includes an outer surface, where the outer surface of the tensioning nut is retained to the inner surface of the coupler body.

The disclosure also provides for a method of forming a barrier cable assembly. The method includes supplying a first barrier cable length, supplying a second barrier cable length and assembling a barrier cable coupler. The barrier cable coupler is assembled by supplying a coupler body, the coupler body including an inner surface, and the coupler body having a first end and a second end. The assembling further comprises retaining a fixed end spring cap within the inner surface of the coupler body at the first end of the coupler body and supplying one or more fixed end wedges. The assembling also includes retaining a fixed end spring between the fixed end spring cap and the one or more fixed end wedges and following positioning the fixed end spring, retaining a fixed retaining collar to the coupler body at the first end of the coupler body. The assembling also includes retaining a tension end spring cap within the inner surface of the coupler body at the second end of the coupler body and supplying one or more tensioning end wedges. The assembling also includes positioning a tensioning end spring between the tensioning end spring cap and the one or more tensioning end wedges and following positioning the tensioning end spring, inserting a tensioning retaining collar into the coupler body at the second end of the coupler body. The assembling further includes retaining the tensioning retaining collar within the coupler body and inserting the first length of barrier cable into the first end of the coupler body such that the first length of the barrier cable enters the fixed retaining collar and engages the one or more fixed end wedges. The method includes inserting the second length of barrier cable into the second end of the coupler body such that the second length of the barrier cable enters tensioning retaining collar through the tensioning end nut and engages the one or more tensioning end wedges and rotating the tensioning end nut. The method also includes tensioning the first length of barrier cable and second length of barrier cable forming the barrier cable assembly.

In addition, the disclosure includes a barrier cable coupler for coupling two lengths of barrier cable. The barrier cable coupler includes a coupler body, and a first and second retainer assembly. Each retainer assembly includes a retainer bolt, each retainer bolt having a threaded extension extending into the interior of the coupler body. Each retainer assembly also includes a retainer collar mechanically coupled to the respective retainer bolt, each retainer collar including a tapered inner surface. Each retainer assembly also includes one or more wedges positioned within each of the retainer collars. The threaded extension of the first retainer assembly is threaded in a first direction and the threaded extension of the second retainer assembly is threaded in a second direction. The barrier cable coupler also includes a tensioning nut. The tensioning nut is threadedly coupled to the threaded extensions of the first and second retainer assembly. The tensioning nut includes inner threaded surfaces corresponding with the threads of the corresponding threaded extensions such that rotation of the tensioning nut moves the first and second retainer assemblies into the interior of the coupler body.

BRIEF DESCRIPTION OF THE DRAWINGS

The present disclosure is best understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
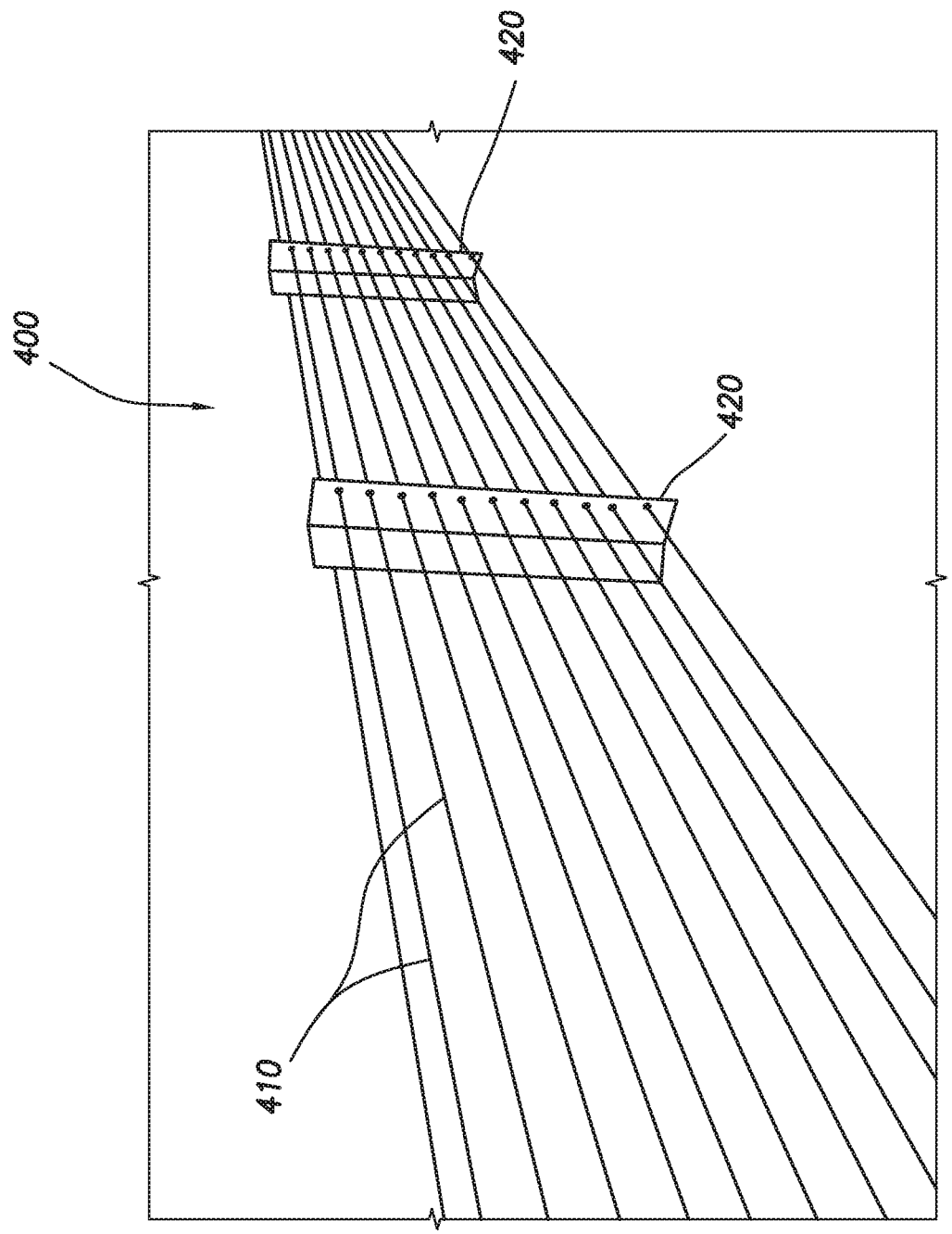
FIG. 1 is a depiction of a barrier cable system consistent with at least one embodiment of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

FIG. 1 depicts an exemplary barrier cable system 400. Barrier cable system 400 may include one or more barrier cables 410. Barrier cables 410 may be formed of metal and may be placed under tension to restrain movement of, for example, vehicles and/or pedestrians. Barrier cables may extend between two or more barrier retaining structures 420. Examples of barrier retaining structures 420 may include, but are not limited to, columns or walls.

Figure 2:
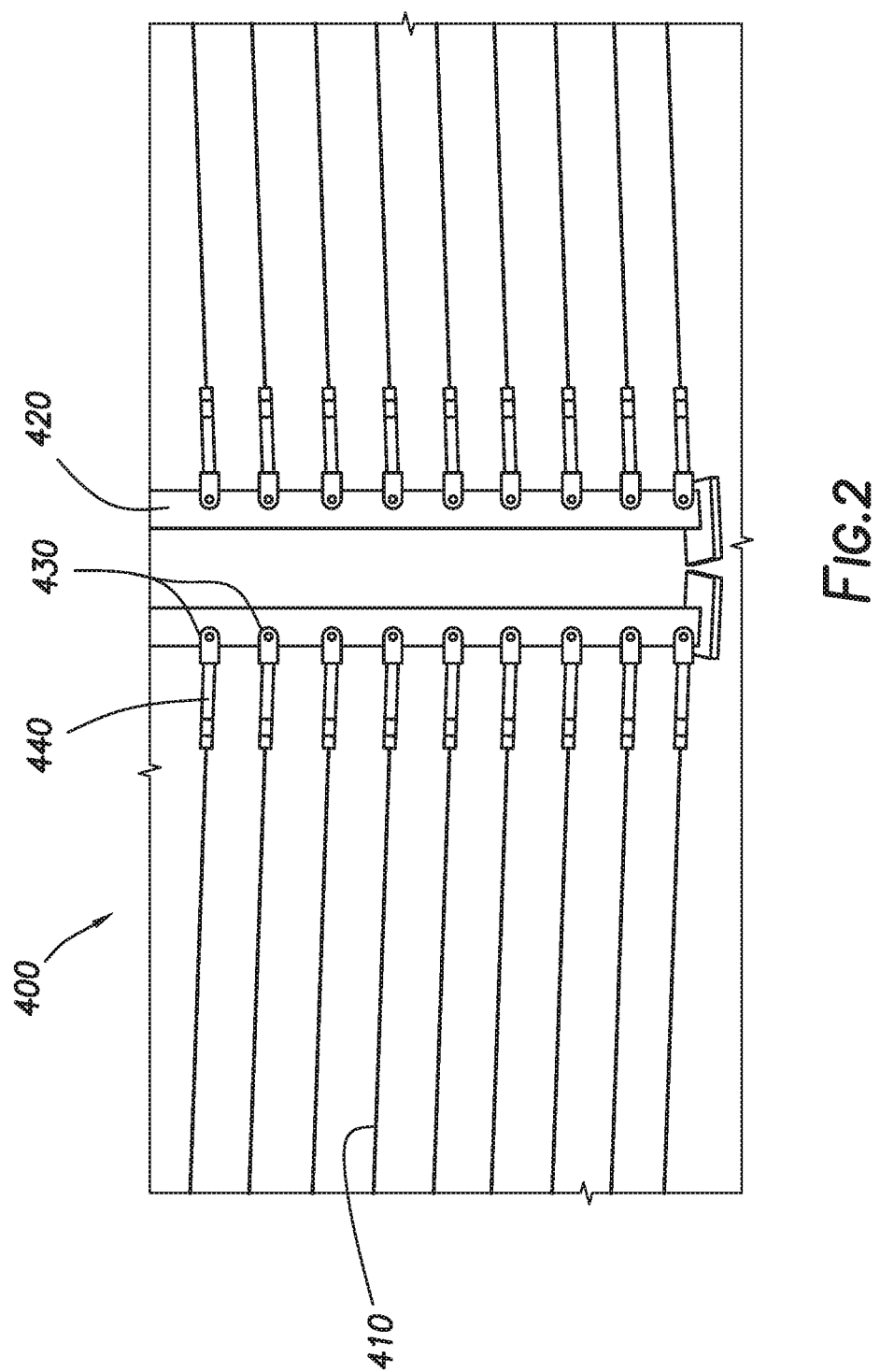
FIG. 2 is a depiction of a barrier cable system consistent with at least one embodiment of the present disclosure.

FIG. 2 depicts other aspects of barrier cable system 400. Barrier cables 410 may be mechanically connected to barrier retaining structures 420 by anchors 430. Barrier cables 410 may be tensioned by tension member 440.

Figure 3:
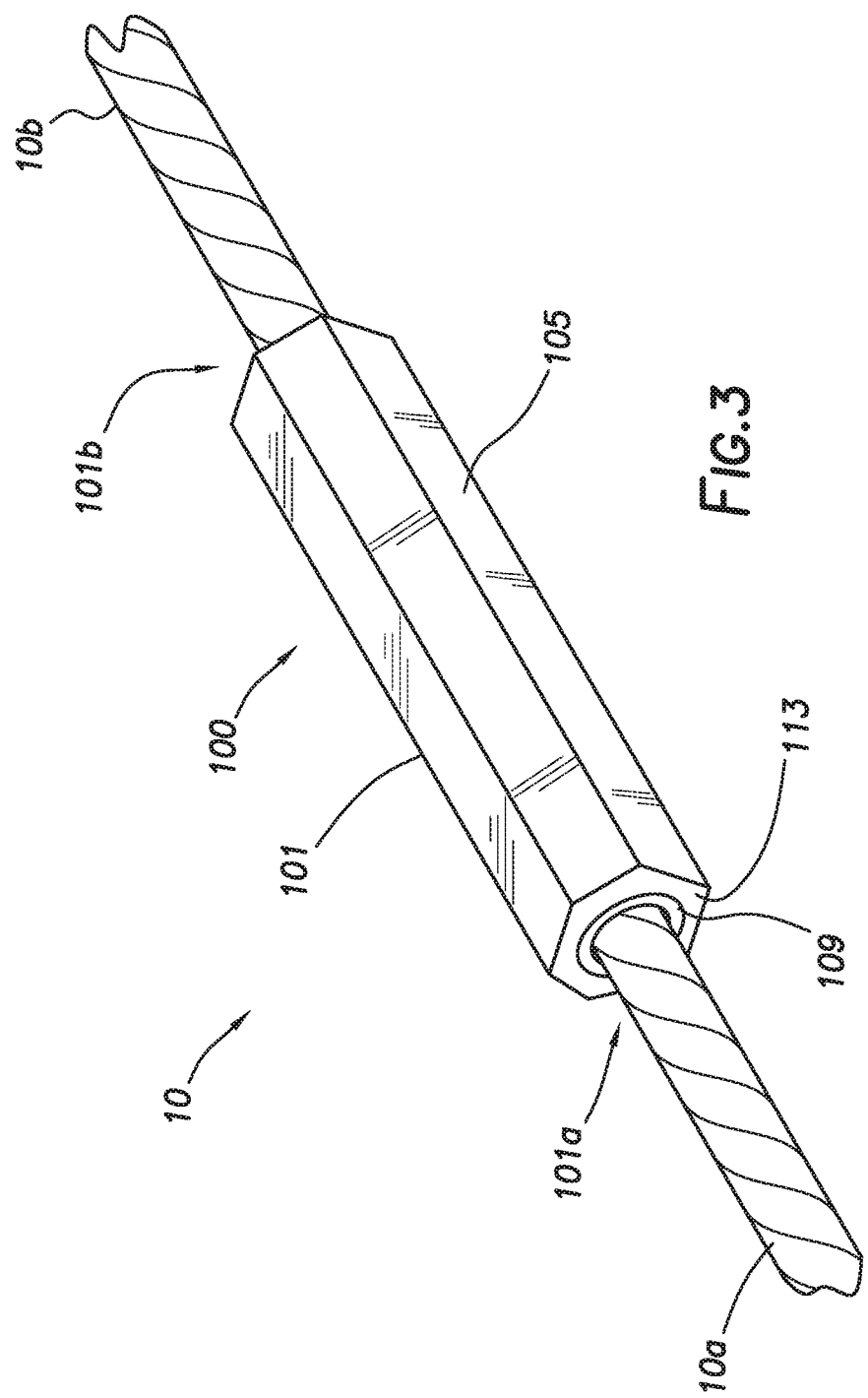
FIG. 3 is a perspective view of a barrier cable coupler assembly consistent with at least one embodiment of the present disclosure.

Referring now to FIG. 3, when it is desired to couple the ends of two pieces of cable, a barrier cable coupler 100 in accordance with the present disclosure may be used. Barrier cable coupler 100 may be used to mechanically couple two lengths of barrier cable, shown in FIG. 3 as first barrier cable length 10a and second barrier cable length 10b. The combination of barrier cable coupler 100, first barrier cable length 10a and second barrier cable length 10b form a barrier cable assembly 10.

Barrier cable coupler 100 may include a coupler body 101, which may comprise a tube having outer surface 105. In some embodiments, outer surface 105 may be cylindrical. In some embodiments, as depicted in FIG. 3, the cross-section of coupler body 101 may be square, hexagonal partially hexagonal, or partially square, so as to, for example and without limitation, allow for engagement of coupler body 101 with a hand tool such as a wrench. In some embodiments, outer surface 105 may include one or more outer surface gripping features such as lands, tabs, or holes to allow a tool to be temporarily coupled to coupler body 101 as discussed further herein below.

Figure 4:
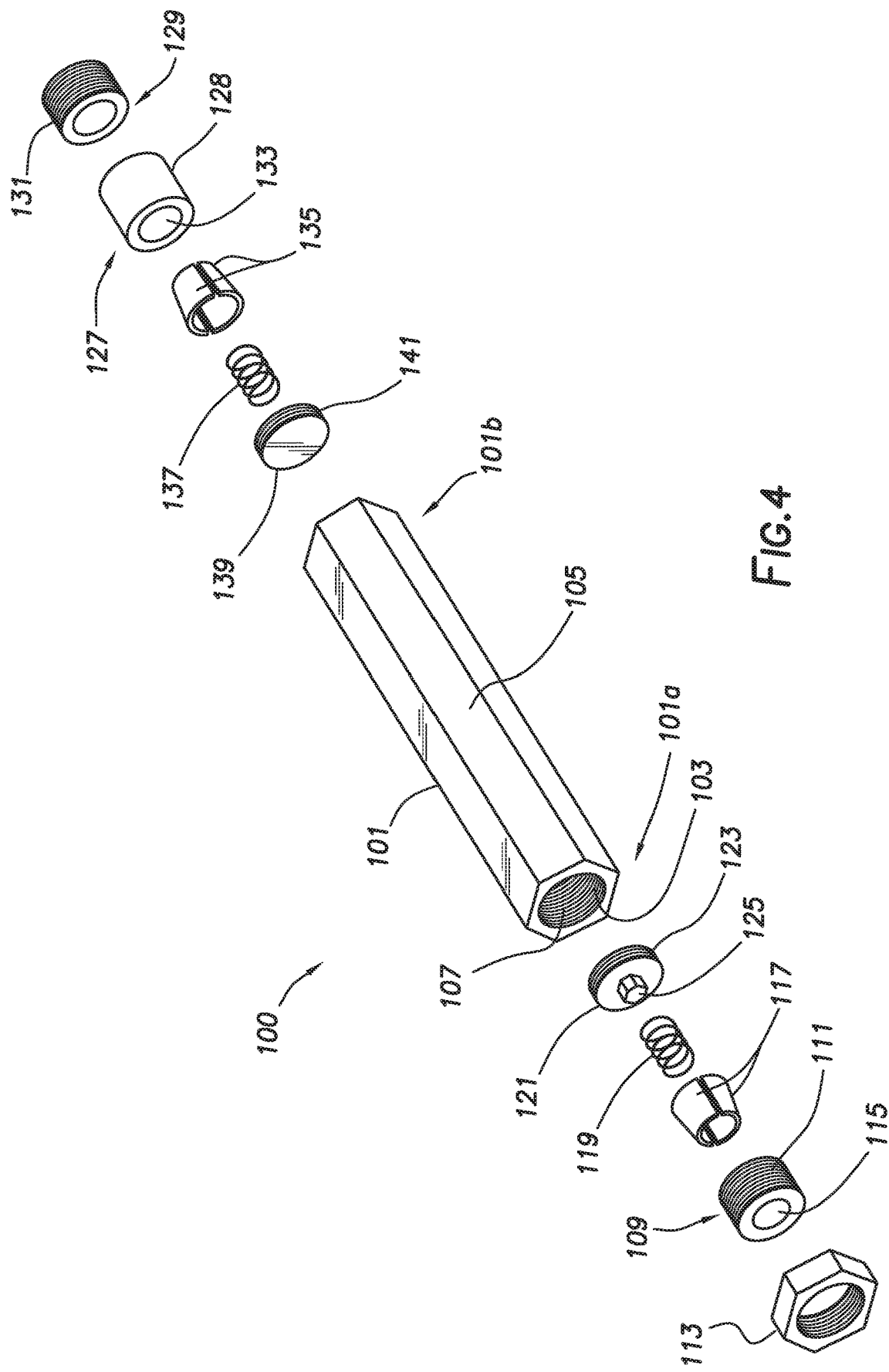
FIG. 4 is an exploded view of the barrier cable coupler of FIG. 3.
Figure 5:
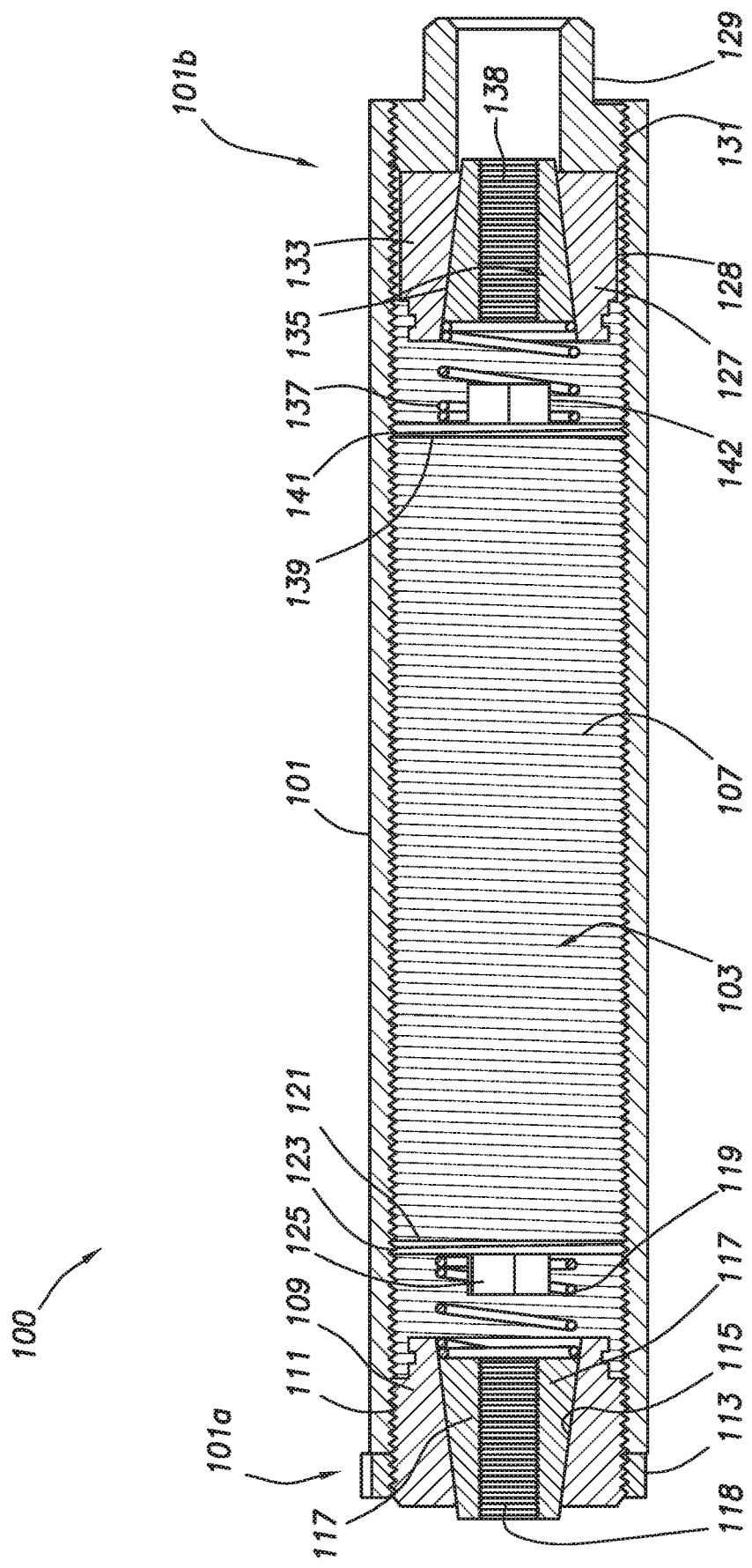
FIG. 5 is a cross-section of the barrier cable coupler of FIG. 3.

Referring now to FIGS. 4 and 5, coupler body 101 may have an inner surface 103 extending from first end 101a to second end 101b of coupler body 101. Inner surface 103 may be cylindrical or generally cylindrical. In some embodiments, coupler body 101 may include internal thread 107 formed on inner surface 103, as shown.

In some embodiments, barrier cable coupler 100 may further include a fixed retaining collar 109, which may be a hollow cylinder having an outer surface 111. Fixed retaining collar 109 may be retained to inner surface 103 of coupler body 101. As used herein, retain refers to, retention by, for example and without limitation, threading, pins, snaps, mechanical welding, a friction fit, or any similar type of closure known in the art. For example, outer surface 111 may include threads that correspond with and are adapted to mate with internal thread 107 of coupler body 101. Thus, fixed retaining collar 109 may be, retained, such as by threaded coupling, to coupler body 101 at first end 101a of coupler body 101. In some such embodiments, fixed retaining collar 109 may be partially threaded into coupler body 101 and held in place by a lock nut 113. In certain embodiments, lock nut 113 may be a jam nut. Lock nut 113 may be threadedly coupled to fixed retaining collar 109 and, for example and without limitation, prevent or retard rotation of coupler body 101 with respect to fixed retaining collar 109. In other embodiments, lock nut 113 may be omitted. In certain embodiments where lock nut 113 is omitted, rotation of coupler body 101 with respect to fixed retaining collar 109 may be prevented or retarded by welding coupler body 101 to retaining collar 109. In yet other embodiments, rotation of coupler body 101 with respect to fixed retaining collar 109 may be prevented or retarded by other chemical or mechanical means including, for example and without limitation, pins, snaps, mechanical or chemical welding, a friction fit, or any other similar type of closure known in the art.

Figure 10:
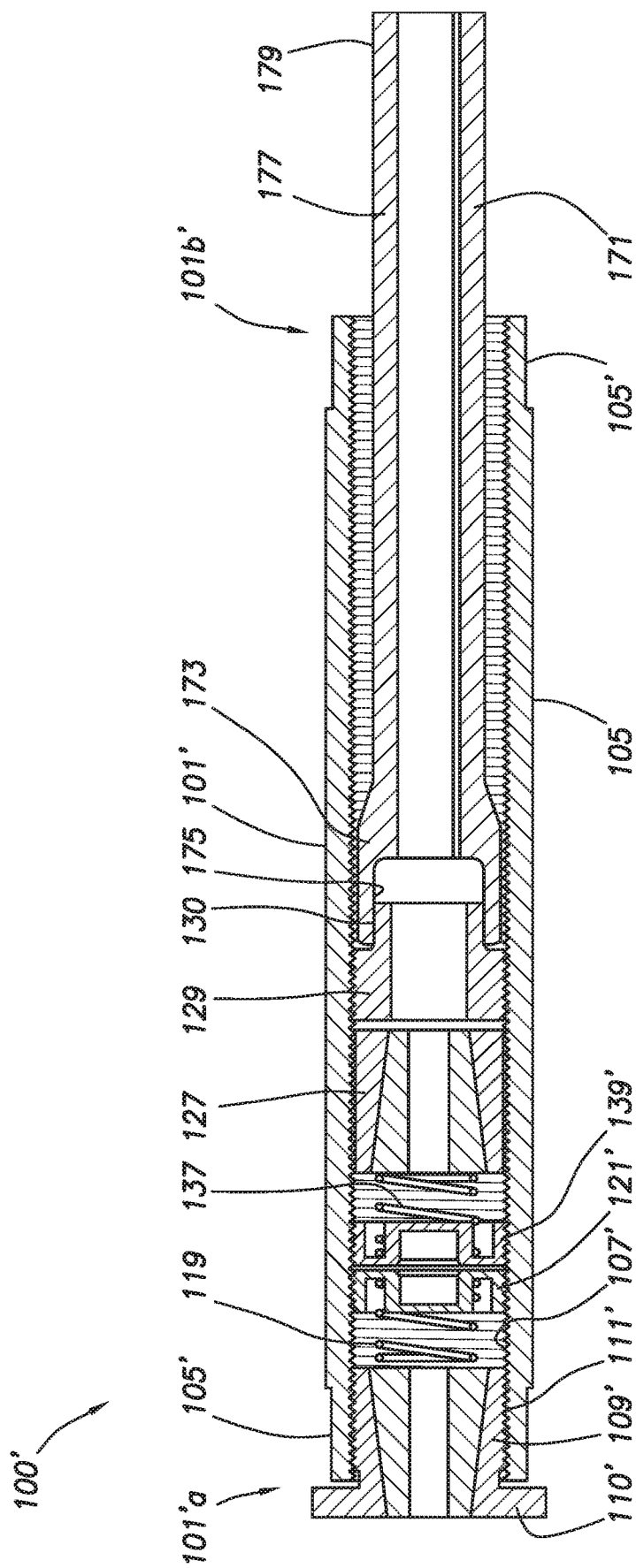
FIG. 10 depicts a barrier cable system consistent with at least one embodiment of the present disclosure.
Figure 11:
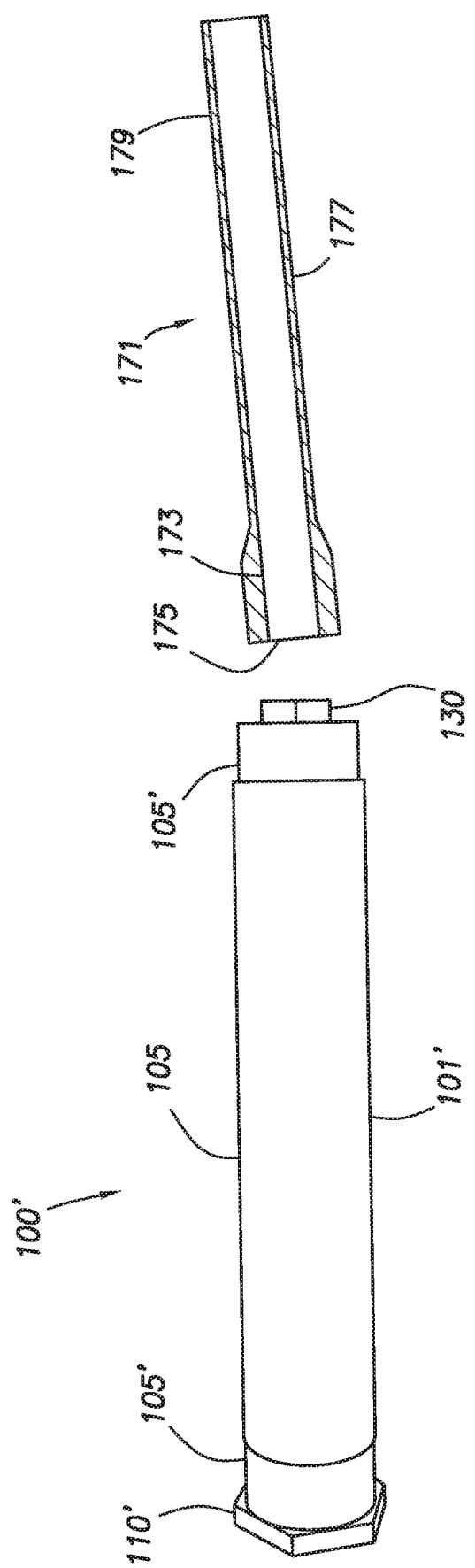
FIG. 11 depicts a barrier cable coupler and a tensioning wrench consistent with at least one embodiment of the present disclosure.

Referring briefly to FIGS. 10 and 11, another embodiment of coupler body 101 may include a coupler body 101' having one or more lands 105' positioned on outer surface 105 to allow a tool to be temporarily coupled to coupler body 101'. In certain embodiments, lands 105' may be substantially flat areas on outer surface 105. In the embodiment shown in FIG. 10, fixed retaining collar 109' may include retaining collar flange 110' that may abut coupler body 101' at end 101a' of coupler body 101' when fixed retaining collar 109' is tightened.

Referring again to FIGS. 4 and 5, in some embodiments, fixed retaining collar 109 may include a tapered (frustoconical) inner surface 115 configured to receive one or more fixed end wedges 117. The diameter of tapered inner surface 115 may be smallest at its outer end, where fixed retaining collar 109 is held by lock nut 113. While FIG. 4 depicts two fixed end wedges 117, any number of fixed end wedges 117 may be used, including a single fixed end wedge or three or more fixed end wedges 117. Fixed end wedges 117 may be tapered such that the taper of fixed end wedges 117 corresponds to the taper of tapered inner surface 115. Further, as best shown in FIG. 5, the inner surface of each wedge 117 may include teeth, ridges, or other surface features to enhance frictional engagement with a length of cable extending therethrough.

Fixed end wedges 117 may be used to retain first barrier cable length 10a within fixed retaining collar 109 when first barrier cable length 10a is inserted into fixed retaining collar 109. Fixed end wedges 117 may be tapered such that any tensile force applied to first barrier cable length 10a may cause fixed end wedges 117 to be pulled into tapered inner surface 115 of fixed retaining collar 109, increasing normal force on first barrier cable length 10a, and therefore resisting the removal of first barrier cable length 10a from fixed retaining collar 109.

In some embodiments, fixed end wedges 117 may be also urged into engagement with fixed retaining collar 109 by a fixed end spring 119 that is in compression when coupler assembly 10 is assembled. Fixed end spring 119 may be positioned between fixed end wedges 117 and a fixed end spring cap 121. Fixed end spring cap 121 may or may not have a threaded outer surface 123. Fixed end spring cap 121 may be retained to inner surface 103 of coupler body 101, such as by threadedly coupling to internal thread 107 of coupler body 101. In some embodiments, fixed end spring cap 121 may include threading fastener 125 that may be engaged by a tool (not shown) to facilitate rotation of fixed end spring cap 121 during installation to coupler body 101. Threading fastener 125 may be any fastener known in the art including, for example and without limitation, a hexagonal head as depicted in FIG. 4. In other embodiments, fixed end spring cap 121' may be unthreaded and may be a cap inserted with a friction or press fit into the interior of coupler body 101'.

Still referring to FIGS. 4 and 5, in some embodiments, during assembly of barrier cable coupler 100, fixed end spring cap 121 may be retained to first end 101a of coupler body 101, such as by threaded coupling. Fixed end spring 119 may be inserted and positioned against fixed end spring cap 121, followed by fixed end wedges 117 and fixed retaining collar 109, which may be threadedly coupled to coupler body 101. Lock nut 113, if a lock nut 113 is used, may then be secured to fixed retaining collar 109, retaining fixed retaining collar 109 to coupler body 101. Alternatively, as in the embodiment depicted in FIG. 10, fixed retaining collar 109' may be tightened to coupler body 101' until retaining collar flange 110' abuts coupler body 101'. Likewise, in other embodiments, fixed retaining collar 109 may be secured to coupler body by any of pins, snaps, mechanical welding, a friction fit, or any similar type of closure known in the art.

Referring again to FIGS. 4 and 5, in some embodiments, barrier cable coupler 100 may include a tensioning retaining collar 127, which may be a hollow cylinder having an outer surface 128. In certain embodiments, outer surface 128 is not threaded. Outer surface 128 may be sized such that tensioning retaining collar 127 is configured to slide within inner surface 103 of coupler body 101. Tensioning retaining collar 127 may be at least partially inserted, and in some embodiments, completely inserted, into coupler body 101 at second end 101b of coupler body 101. In some embodiments, tensioning retaining collar 127 may be retained within coupler body 101 by a tensioning nut 129, which may be a hollow cylinder having a threaded outer surface 131. In some embodiments, outer surface 131 may include threads that correspond with and are configured to mate with internal thread 107 of coupler body 101 so that tensioning nut 129 may be retained to threadedly retained to coupler body 101. Tensioning nut 129 may be retained, such as by threaded coupling, to coupler body 101 at second end 101b of coupler body 101 once tensioning retaining collar 127 is inserted into coupler body 101.

In some embodiments, as depicted in FIGS. 10 and 11, tensioning nut 129 may include a driving head 130 adapted to interlock with a tensioning wrench 171. Tensioning wrench 171 may include tensioning coupler head 173 which may have an inner surface 175 designed to mechanically couple to driving head 130 of tensioning nut 129. Tensioning coupler head 173 may be a socket. In some such embodiments, inner surface 175 and driving head 130 may have corresponding profiles including, for example and without limitation, a square, hexagonal, or other polygonal cross section or may include one or more holes and corresponding pins, one or more splines, or other coupling features known in the art. In some embodiments, tensioning wrench 171 may include tensioning extension 177 that may include tensioning feature 179 adapted to allow temporary coupling of a tool to rotate tensioning wrench 171 as discussed herein below. Tensioning feature 179 may be a square, hexagonal, or other polygonal cross section or may include one or more holes and corresponding pins, one or more splines, or other coupling features known in the art. In some embodiments, tensioning wrench 171 may be a cylinder or tube having a longitudinal cutout extending the length of tensioning wrench 171 to, for example and without limitation, allow tensioning wrench 171 to be used while a second barrier cable length 10b (not shown) is retained by barrier cable coupler 100'.

Referring again to FIGS. 4 and 5, tensioning retaining collar 127 may include a tapered inner surface 133 that may receive one or more tensioning end wedges 135. The diameter of tapered inner surface 133 may be smallest where tensioning retaining collar 127 is held by tensioning nut 129. As with wedges 117, while FIG. 4 depicts two tension end wedges 135, any number of tension end wedges 135 may be used, including a single tension end wedge 135 or three or more tension end wedges 135. Tension end wedges 135 may be tapered such that the taper of tension end wedges 135 corresponds to the taper of tapered inner surface 133. Further, as best shown in FIG. 5, the inner surface of each wedge 117 may include teeth, ridges, or other surface features to enhance frictional engagement with a length of cable extending therethrough.

Tensioning end wedges 135 may be used to retain second barrier cable length 10b (FIG. 3) within tensioning retaining collar 127 once second barrier cable length 10b is inserted into tensioning retaining collar 127. Tensioning end wedges 135 may be tapered such that any tensile force applied to the length of barrier cable may cause tensioning end wedges 135 to be pulled into tapered inner surface 133 of tensioning retaining collar 127, increasing normal force on the sides of second barrier cable length 10b, and therefore resisting the removal of the second barrier cable length 10b from tensioning retaining collar 127.

In some embodiments, tensioning end wedges 135 may additionally be urged into engagement with tensioning retaining collar 127 by a tensioning end spring 137, which may be positioned between tensioning end wedges 135 and tensioning end spring cap 139 and may be in compression when the coupler assembly is assembled. Tensioning end spring cap 139 may or may not have a threaded outer surface 141 and may be retained, such as by threaded coupling, to internal thread 107 of coupler body 101. In some embodiments, tensioning end spring cap 139 may include a threading fastener 142 (FIG. 5) to facilitate rotation of tensioning end spring cap 139 during installation to coupler body 101. Threading fastener 142 may be any fastener known in the art including, for example and without limitation, a hexagonal head. In other embodiments, tensioning end spring cap 139' may be unthreaded and may be a cap inserted with a friction or press fit into the interior of coupler body 101'.

In some embodiments, during assembly of barrier cable coupler 100, tensioning end spring cap 139 may be threadedly coupled to second end 101b of coupler body 101. Tensioning end spring 137 may be inserted into coupler body 101, followed by tensioning end wedges 135 and tensioning retaining collar 127. Tensioning nut 129 may then be threadedly coupled to second end 101b of coupler body 101 such that tensioning nut 129 retains tensioning end spring 137, tensioning end wedges 135, and tensioning retaining collar 127 within coupler body 101.

In some embodiments, once assembled, barrier cable coupler 100 may be used to couple two lengths of barrier cable 10a, 10b as depicted in FIG. 3. First barrier cable length 10a may be inserted into first end 101a of coupler body 101 such that first barrier cable length 10a enters fixed retaining collar 109 and engages fixed end wedges 117, which then retain the end of first barrier cable length 10a within barrier cable coupler 100. Second barrier cable length 10b may be inserted into second end 101b of coupler body 101 such that second barrier cable length 10b enters tensioning retaining collar 127 through tensioning nut 129, engaging tensioning end wedges 135 as discussed above, thereby retaining second barrier cable length 10b within barrier cable coupler 100. Tensioning nut 129 may then be rotated, such as by tensioning wrench 171, causing further tensioning retaining collar 127 to advance into coupler body 101, thereby decreasing the distance between first barrier cable length 10a and second barrier cable length 10b, which may result in tension within barrier cable assembly 10. In some embodiments, rotation of tensioning nut 129 relative to coupler body 101 may be accomplished by gripping coupler body 101 with a first tool and gripping tensioning nut 129 with a second tool to provide counterbalance to the rotation. The first tool and second tools may be wrenches. In some embodiments, outer surface 128 of tensioning retaining collar 127 is free to rotate within coupler body 101 so that tensioning retaining collar 127 and second barrier cable length 10b retained therein will not tend to rotate as tensioning nut 129 is rotated relative to coupler body 101, thereby preventing or reducing torque or twisting on the cable and barrier cable assembly 10.

Figure 6:
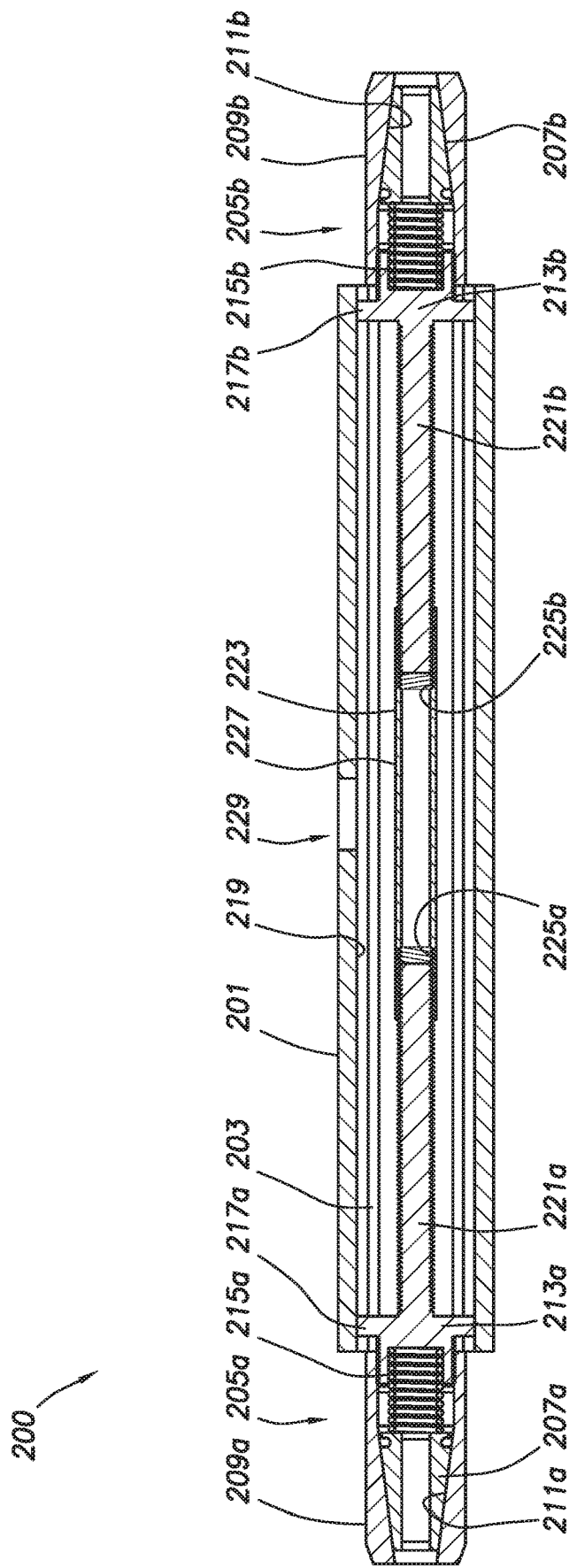
FIG. 6 is a cross-section view of a barrier cable coupler consistent with at least one embodiment of the present disclosure.
Figure 7:
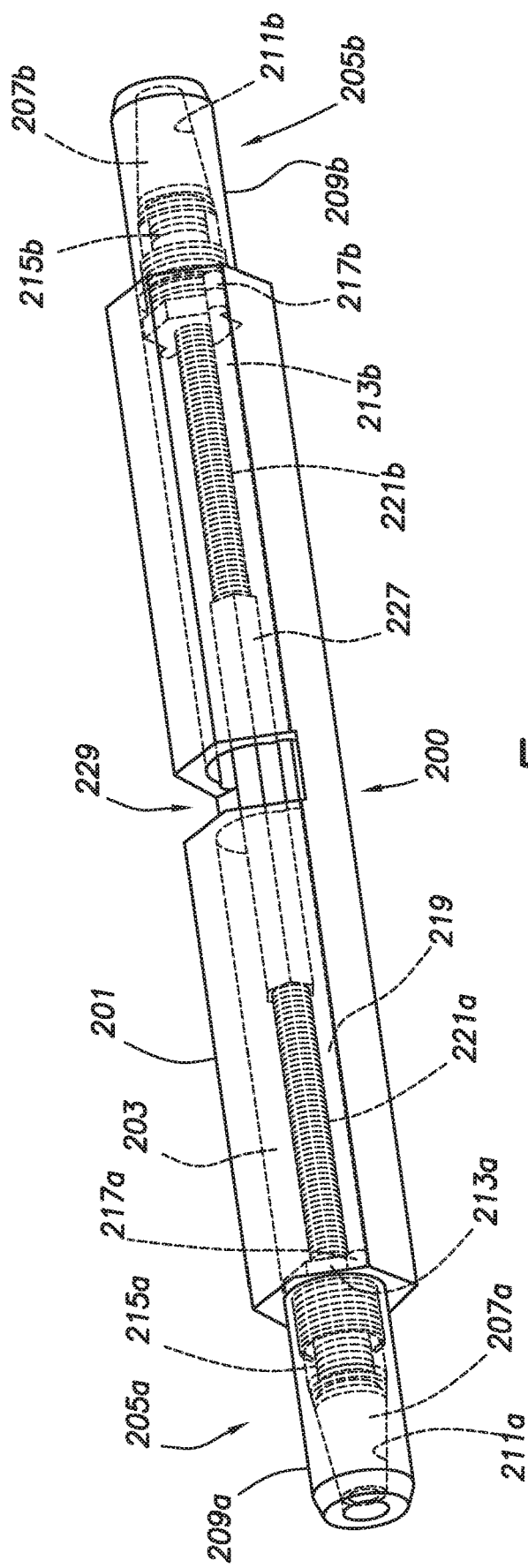
FIG. 7 is a partially transparent perspective view of the barrier cable coupler of FIG. 6.
Figure 8:
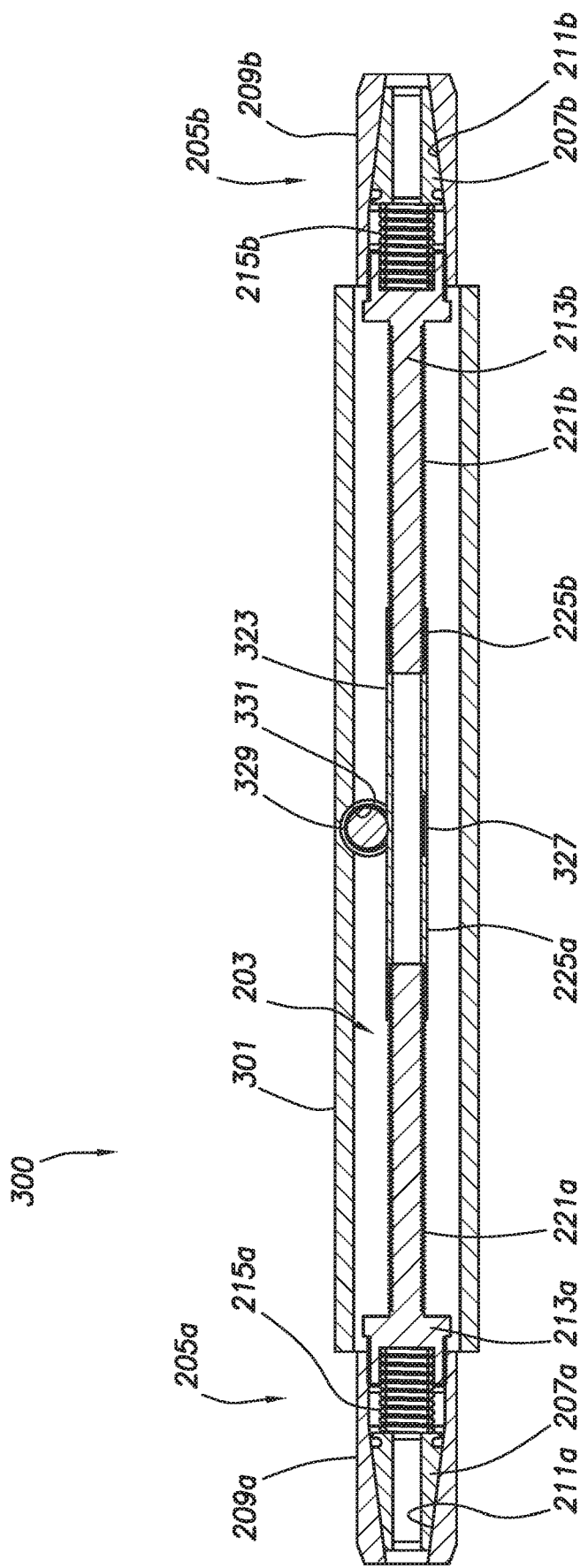
FIG. 8 is a cross section view of a barrier cable coupler consistent with at least one embodiment of the present disclosure.

In some embodiments, as depicted in FIGS. 6-8, barrier cable coupler 200, 300 may include coupler body 201, 301. Coupler body 201, 301 may be formed such that coupler body 201, 301 has a square, hexagonal, partially hexagonal, or partially square outer profile configured to engage with a tool, such as a wrench. In some embodiments, coupler body 201, 301 may include a bore therethrough, providing a smooth or unthreaded inner surface 203.

Referring to FIG. 6, in some embodiments, barrier cable coupler 200 may include first retainer assembly 205a and second retainer assembly 205b. Each retainer assembly 205a, 205b may include one or more retainer wedges 207a, 207b, a retainer collar 209a, 209b, a retainer bolt 213a, 213b, and a spring 215a, 215b. In certain embodiments, retainer wedges 207a, 207b, may be positioned in retainer collar 209a, 209b respectively. Each retainer collar 209a, 209b may include a tapered inner surface 211a, 211b. In some embodiments, retainer collars 209a, 209b may be threadedly or otherwise mechanically coupled to retainer bolts 213a, 213b, respectively. In some embodiments, springs 215a, 215b may be positioned between retainer bolts 213a, 213b and retainer wedges 207a, 207b to urge retainer wedges 207a, 207b into retainer collars 209a, 209b. In some embodiments, each retainer assembly 205a, 205b may be used to retain an end of a length of barrier cable as discussed herein above with respect to first and second lengths of barrier cable 10a, 10b when the end of length of barrier cable is inserted into each respective retainer assembly 205a, 205b.

In some embodiments, each retainer bolt 213a, 213b may include one or more antirotation features that engage with one or more corresponding antirotation features of coupler body 201, 301. As depicted in FIGS. 4-7, antirotation features may include tabs 217a, 217b positioned on retainer bolts 213a, 213b that engage corresponding longitudinal slots 219 formed in coupler body 201, 301. In other embodiments, antirotation features may include one or more co-engaging protrusions, splines, or slots formed on either retainer bolts 213a, 213b and coupler body 201, 301. The antirotation features may prevent rotation of retainer bolts 213a, 213b relative to coupler body 201, 301 during a tightening procedure as discussed herein below.

In some embodiments, each retainer bolt 213a, 213b may include a threaded extension 221a, 221b that extends into coupler body 201, 301. In some embodiments, threaded extensions 221a, 221b may engage a connecting tensioning nut 223, 323. In some embodiments, connecting tensioning nut 223, 323 may include inner threaded surfaces 225a, 225b each adapted to engage with one of threaded extensions 221a, 221b, respectively. In some embodiments, threaded extensions 221a and 221b may be threaded in opposite directions, and the corresponding inner threaded surfaces 225a and 225b may correspondingly be threaded in opposite directions such that rotation of connecting tensioning nut 223, 323 causes both retainer bolts 213a, 213b to be pulled farther into connecting tensioning nut 223, 323 as connecting tensioning nut 223, 323 is rotated. Thus, in some embodiments, once first and second lengths of barrier cable 10a, 10b are each inserted into a respective retainer assembly 205a, 205b, tightening barrier cable coupler 200, 300 may cause the cable ends to be drawn together.

In some embodiments, as depicted in FIGS. 6 and 7, connecting tensioning nut 223 of barrier cable coupler 200 may include square or hexagonal outer surface 227 for engagement with a tool such as a wrench. In such an embodiment, coupler body 201 may include cutout 229 configured to allow access to connecting tensioning nut 223 by the tool. In such an embodiment, connecting tensioning nut 223 may be rotated, causing retainer bolts 213a, 213b along with the rest of retainer assemblies 205a, 205b to be pulled farther into coupler body 201, thereby increasing the tension on barrier cable assembly 10.

Figure 9:
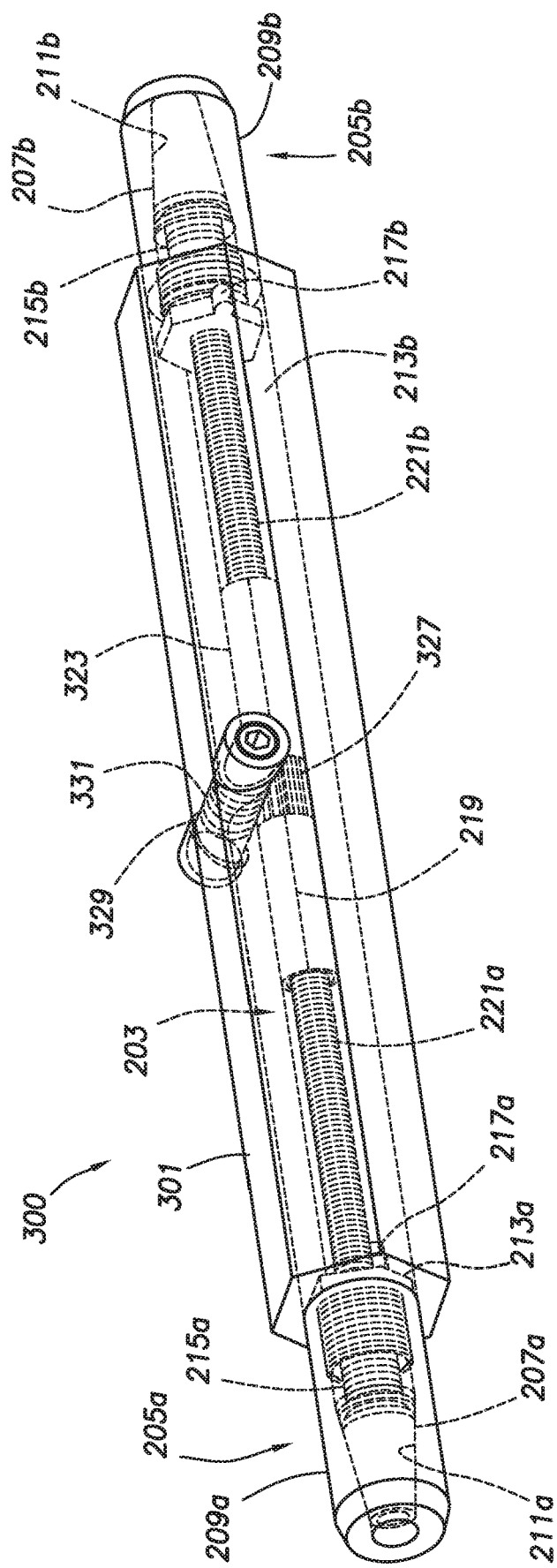
FIG. 9 is a partially transparent perspective view of the barrier cable coupler of FIG. 8.

In some embodiments, as depicted in FIGS. 8, 9, tensioning nut 323 of barrier cable coupler 300 may include external gear teeth 327. External gear teeth 327 may engage with worm screw 329 positioned in worm screw hole 331 formed in coupler body 301. Rotation of worm screw 329, for example by rotation with a wrench or screwdriver, may cause corresponding rotation of tensioning nut 323. In such an embodiment, rotation of worm screw 329 and tensioning nut 323 may cause retainer bolts 213a, 213b along with the rest of retainer assemblies 205a, 205b to be pulled further into coupler body 301, thereby increasing the tension on barrier cable assembly 10.

The foregoing outlines features of several embodiments so that a person of ordinary skill in the art may better understand the aspects of the present disclosure. Such features may be replaced by any one of numerous equivalent alternatives, only some of which are disclosed herein. One of ordinary skill in the art should appreciate that they may readily use the present disclosure as a basis for designing or modifying other processes and structures for carrying out the same purposes and/or achieving the same advantages of the embodiments introduced herein. One of ordinary skill in the art should also realize that such equivalent constructions do not depart from the spirit and scope of the present disclosure and that they may make various changes, substitutions, and alterations herein without departing from the spirit and scope of the present disclosure.

What is claimed is:
1. A barrier cable coupler for coupling two lengths of barrier cable comprising:
 a coupler body, the coupler body including a threaded inner surface, the coupler body having a first end and a second end;

a fixed retaining collar, the fixed retaining collar having an outer surface, the fixed retaining collar retained to the first end of the coupler body, the fixed retaining collar including a tapered inner surface;

one or more fixed end wedges positioned within the tapered inner surface of the fixed retaining collar;

a tensioning retaining collar, the tensioning retaining collar having an outer surface, the tensioning retaining collar positioned at least partially within the second end of the coupler body, the tensioning retaining collar including a tapered inner surface;

one or more tensioning end wedges positioned within the tapered inner surface of the tensioning retaining collar; and a tensioning nut, the tensioning nut including a threaded outer surface engaging the threaded inner surface of the second end of the coupler body and retaining the tensioning retaining collar therein wherein the tensioning nut is adapted to be completely received in the coupler body and adapted to be advanced into the coupler body using a tensioning wrench that extends into the coupler body.

2. The barrier cable coupler of claim 1 wherein the outer surface of the fixed retaining collar is threaded and engages the threaded inner surface of the coupler body.

3. The barrier cable coupler of claim 1 wherein at least one of the first and second coupler body ends further comprises:

an end spring cap retained within the coupler body; and an end spring in compression between the end spring cap and the one or more fixed end wedges.

4. The barrier cable coupler of claim 3 wherein the end spring cap further comprises a threading fastener.

5. The barrier cable coupler of claim 3 wherein the end spring cap is not threaded and engages the inner surface of the coupler body by friction.

6. The barrier cable coupler of claim 1 wherein the barrier cable coupler further including a means for preventing rotation of the fixed retaining collar relative to the coupler body wherein the means for preventing rotation is a lock nut.

7. The barrier cable coupler of claim 1 wherein the coupler body has an outer surface and a cross-section that is square, hexagonal, partially square, or partially hexagonal.

8. The barrier cable coupler of claim 7 wherein the outer surface includes one or more outer surface gripping features.

9. The barrier cable coupler of claim 1 wherein the outer surface of the tensioning retaining collar is not threaded.

10. The barrier cable coupler of claim 1 wherein the tensioning nut includes a driving head.

11. A method of forming a barrier cable assembly comprising:
　a) providing a first barrier cable length and a second barrier cable length, each cable length having an end;
　b) providing a barrier cable coupler comprising:
　　1) a coupler body having an inner surface, an outer surface, a first end, and a second end;
　　2) a fixed retaining collar, the fixed retaining collar having an outer surface, the fixed retaining collar retained to the first end of the coupler body, the fixed retaining collar including a tapered inner surface;
　　3) one or more fixed end wedges positioned within the tapered inner surface of the fixed retaining collar;
　　4) a tensioning retaining collar, the tensioning retaining collar having an outer surface, the tensioning retaining collar positioned at least partially within the second end of the coupler body, the tensioning retaining collar including a tapered inner surface;
　　5) one or more tensioning end wedges positioned within the tapered inner surface of the tensioning retaining collar;
　　6) a tensioning nut, the tensioning nut including a threaded outer surface engaging the threaded inner surface of the second end of the coupler body and retaining the tensioning retaining collar therein;
　c) inserting the end of the first length of barrier cable into the first end of the coupler body such that the end of the first length of the barrier cable enters the fixed retaining collar and engages the one or more fixed end wedges;
　d) inserting the end of the second length of barrier cable into the second end of the coupler body such that the end of the second length of the barrier cable enters the tensioning retaining collar through the tensioning end nut and engages the one or more tensioning end wedges; and
　e) advancing the tensioning end nut into the coupler body by rotating the tensioning end nut using a tensioning wrench that extends into the coupler body.

12. The method of claim 11 wherein step e) applies tension to at least one of the lengths of barrier cable.

13. The method of claim 11, further including a step of preventing rotation of the fixed retaining collar relative to the coupler body by at least partially threading the fixed retaining collar into the coupler body and securing a jam nut to the fixed retaining collar.

14. The method of claim 11 wherein the tensioning retaining collar has an outer surface that is not threaded and step e) includes sliding the tensioning retaining collar into the coupler body.

* * * * *